(12) United States Patent
Nakagawa et al.

(10) Patent No.: US 12,467,433 B2
(45) Date of Patent: Nov. 11, 2025

(54) WIND POWER GENERATION SYSTEM

(71) Applicant: TOYOTA JIDOSHA KABUSHIKI KAISHA, Aichi (JP)

(72) Inventors: Takuya Nakagawa, Toki (JP); Shunsuke Suzuki, Nagoya (JP); Masaya Hikita, Kariya (JP); Tsutomu Araki, Okazaki (JP)

(73) Assignee: TOYOTA JIDOSHA KABUSHIKI KAISHA, Aichi (JP)

(*) Notice: Subject to any disclaimer, the term of this patent is extended or adjusted under 35 U.S.C. 154(b) by 157 days.

(21) Appl. No.: 18/503,181

(22) Filed: Nov. 7, 2023

(65) Prior Publication Data

US 2024/0175424 A1 May 30, 2024

(30) Foreign Application Priority Data

Nov. 28, 2022 (JP) ................. 2022-189387

(51) Int. Cl.

| | |
|---|---|
| *F03D 9/30* | (2016.01) |
| *E04H 12/10* | (2006.01) |
| *F03D 13/20* | (2016.01) |
| *F03D 80/80* | (2016.01) |

(52) U.S. Cl.
CPC ............. *F03D 9/30* (2016.05); *E04H 12/10* (2013.01); *F03D 13/20* (2016.05); *F03D 80/80* (2016.05); *F05B 2240/9121* (2013.01); *Y02E 10/74* (2013.01)

(58) Field of Classification Search
CPC .......... F03D 13/20; F03D 13/203; F03D 3/02; F03D 13/22; E04H 12/10; F05B 2240/9121; Y02E 10/70
See application file for complete search history.

(56) References Cited

U.S. PATENT DOCUMENTS

| | | | | |
|---|---|---|---|---|
| 1,718,682 A | * | 6/1929 | Bruce ........................ | F03D 1/00 416/14 |
| 4,134,707 A | * | 1/1979 | Ewers ...................... | F03D 13/20 290/55 |
| 4,245,958 A | * | 1/1981 | Ewers ...................... | F03D 13/20 416/197 A |
| 4,302,684 A | * | 11/1981 | Gogins ................... | E01B 25/00 505/879 |
| 4,323,331 A | * | 4/1982 | Schachle ................. | F03D 13/20 416/9 |

(Continued)

FOREIGN PATENT DOCUMENTS

| | | |
|---|---|---|
| JP | H07020100 U | 4/1995 |
| JP | 2003-139042 A | 5/2003 |

(Continued)

*Primary Examiner* — Brent W Herring

(74) *Attorney, Agent, or Firm* — HAUPTMAN HAM, LLP

(57) ABSTRACT

A wind power generation system including a steel tower and a wind power generator is provided. The wind power generation system may include: a plurality of foundations; a steel tower; a wind power generator; and a support structure supporting the wind power generator. The steel tower may include a plurality of main column members extending upward from base ends fixed to the foundations. At least a portion of the support structure is fixed to at least one of the plurality of foundations without intervention of the plurality of main column members.

2 Claims, 6 Drawing Sheets

(56) References Cited

U.S. PATENT DOCUMENTS

| | | | | | |
|---|---|---|---|---|---|
| 4,786,235 | A | * | 11/1988 | Van der Veken | ....... F03D 13/20 416/11 |
| 5,429,480 | A | * | 7/1995 | Van Der Veken | ...... F03D 13/20 415/60 |
| 6,064,123 | A | * | 5/2000 | Gislason | ................. F03D 13/20 290/55 |
| 8,123,482 | B2 | * | 2/2012 | Achard | ................. F03B 17/063 415/4.4 |
| 8,931,235 | B2 | * | 1/2015 | Baker | ....................... F03D 1/02 52/651.01 |
| 2020/0347634 | A1 | * | 11/2020 | Fateh | ..................... F03D 13/40 |

FOREIGN PATENT DOCUMENTS

| | | |
|---|---|---|
| JP | 2007-263087 A | 10/2007 |
| JP | 2020-125752 A | 8/2020 |

\* cited by examiner

WIND POWER GENERATION SYSTEM

REFERENCE TO RELATED APPLICATION

This application claims priority from Japanese Patent Application No. 2022-189387 filed on Nov. 28, 2022. The entire content of the priority application is incorporated herein by reference.

BACKGROUND ART

The technology disclosed herein relates to a wind power generation system.

Japanese Patent Application Publication No. 2003-139042 discloses a structure in which a wind power generator is housed and arranged inside a steel tower on which power transmission lines are arranged.

DESCRIPTION

In the technology of Japanese Patent Application Publication No. 2003-139042, a self-weight of the wind power generator and wind load to which the wind power generator is subjected are all applied to the steel tower. The steel tower may be damaged by overload.

A wind power generation system disclosed herein may comprise a plurality of foundations, a steel tower, a wind power generator, and a support structure supporting the wind power generator. The steel tower comprises a plurality of main column members extending upward from base ends fixed to the foundations. At least a portion of the support structure is fixed to at least one of the plurality of foundations without intervention of the plurality of main column members.

In the above configuration, at least a part of the self-weight of the wind power generator and the wind load to which the wind power generator is subjected can be directly received by the foundations without being applied to the main column members of the steel tower. Since load burden on the main column members can be reduced, damage to the main column members due to overloading can be suppressed.

Figure 1:
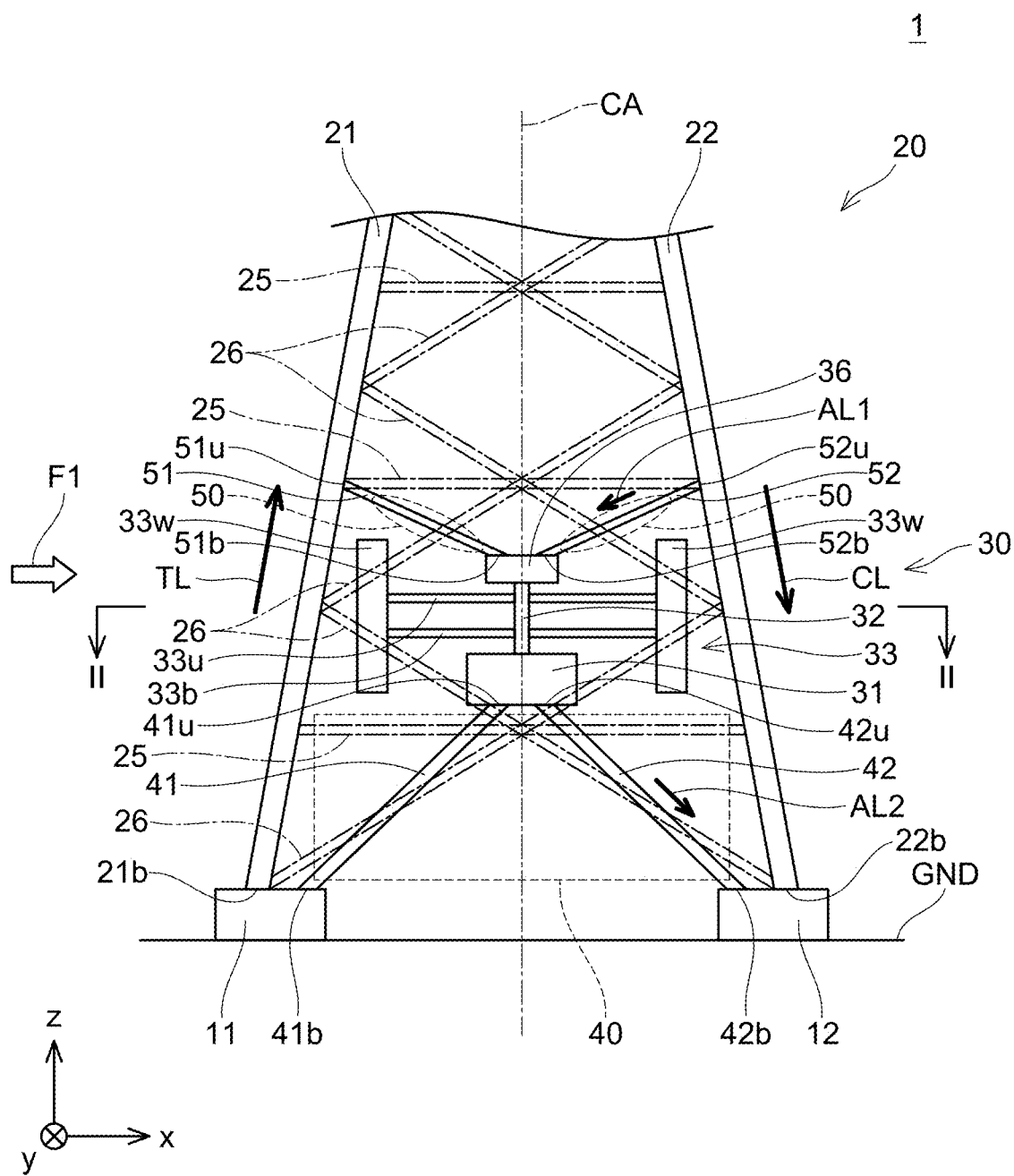
FIG. 1 shows a schematic side view of a wind power generation system 1.

The support structure may comprise a lower part structure located below the wind power generator. The lower part structure may be fixed to at least one of the plurality of foundations without intervention of the plurality of main column members.

In the above configuration, at least a part of the self-weight of the wind power generator can be directly received by the foundations without being applied to the main column members of the steel tower. Load burden on the main column members can be reduced.

The support structure may comprise an upper part structure located above the wind power generator. The upper part structure may be connected to at least one of the plurality of main column members.

Moment load may be applied to the main column members due to wind load. In the above configuration, the upper part structure can receive a part of the moment load applied to the main column members, thereby increasing a resistance of the main column members against the moment load.

The upper part structure may comprise a diagonal member extending from the wind power generator toward one of the plurality of main column members, as the diagonal member is displaced upward.

In the above configuration, a part of the moment load applied to the upper part structure can be received as an axial load of the diagonal member. Thus a load-bearing capacity of the upper part structure can be increased.

The wind power generator may be located inside a steel tower. The lower part structure may comprise a plurality of leg members. Each of the plurality of foundations may be fixed to both a base end of a corresponding one of the plurality of main column members and a base end of a corresponding one of the plurality of leg members.

The above configuration can appropriately allow to reduce the load burden on the main column members.

Representative, non-limiting examples of the present disclosure will now be described in further detail with reference to the attached drawings. This detailed description is merely intended to teach a person of skill in the art further details for practicing preferred aspects of the present teachings. Furthermore, each of the additional features and teachings disclosed below may be utilized separately or in conjunction with other features and teachings. Furthermore, each of the additional features and teachings disclosed below may be utilized or in conjunction with other features and teachings to provide improved wind power generation systems.

Furthermore, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in the following detailed description. Furthermore, various features of the above-described and below-described representative examples, as well as the various independent and dependent claims, may be combined in ways that are not specifically and explicitly enumerated. Furthermore, various features of the above- and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of All features disclosed in the description and/or the claims are intended to be disclosed separately and independently from each other for the purpose of original written disclosure, as well as for the purpose of restricting the claimed subject matter, independent of the compositions of the features in the In addition, all value ranges or indications of groups of entities are intended to disclose every possible intermediate value or intermediate entity for the purpose of the In addition, all value ranges or indications of groups of entities are intended to disclose every possible intermediate disclosure for the purpose of original written disclosure, as well as for the purpose of restricting the claimed subject matter.

EMBODIMENTS

First Embodiment (Configuration of Wind Power Generation System 1)

Figure 2:
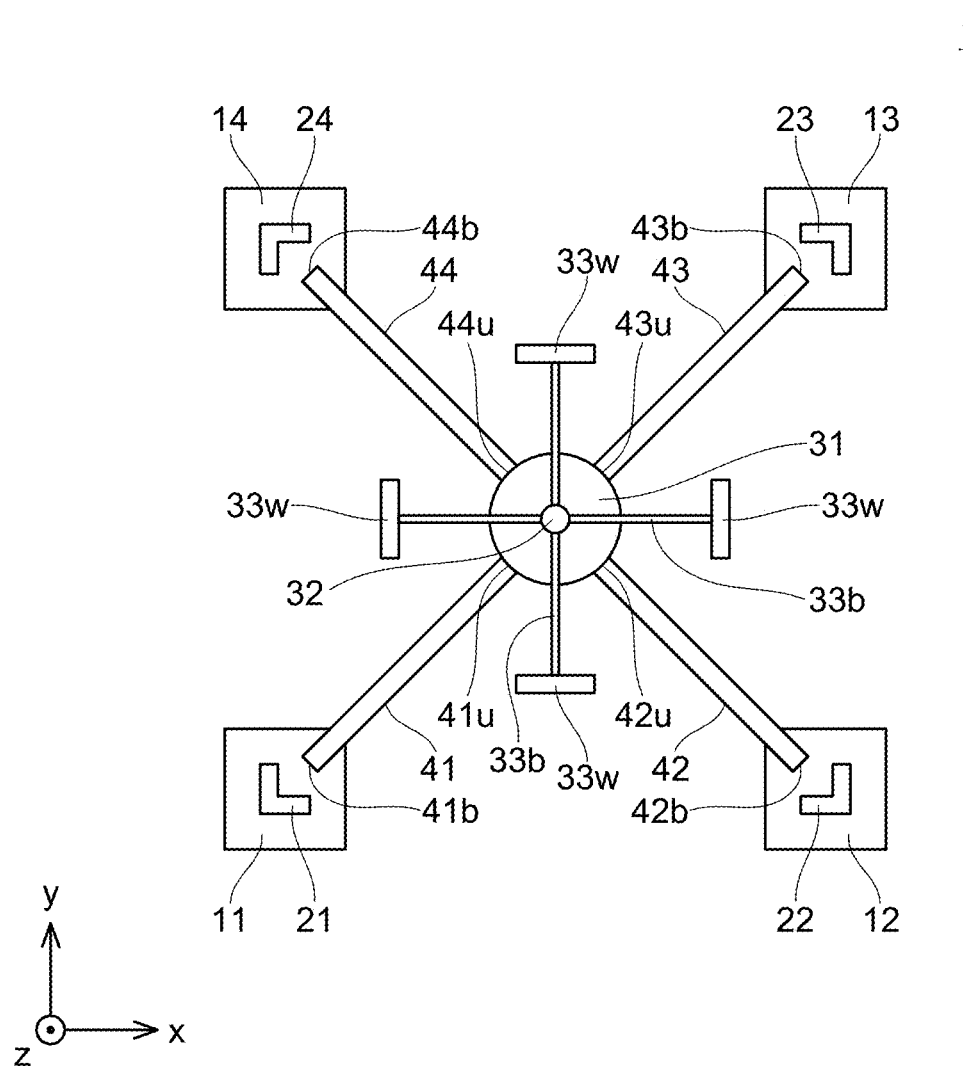
FIG. 2 is a schematic top view taken from a section II-II of FIG. 1.

FIG. 1 shows a schematic side view of a wind power generation system 1. FIG. 2 shows a schematic top view of the wind power generation system 1 viewed from a section II-II of FIG. 1. FIG. 2 shows only main components for clarity. The wind power generation system 1 mainly comprises foundations 11-14, a steel tower 20, a wind power generator 30, a lower part structure 40, and an upper part structure 50.

The foundations 11-14 are fixed to a ground GND. The foundations 11-14 are structural members for supporting the steel tower 20. A type of the foundations 11-14 is not limited and may be, for example, a concrete foundation or a steel foundation. As shown in FIG. 2, the foundations 11-14 are located at four corners of a quadrilateral.

The steel tower 20 is a structure on which unshown transmission lines are to be placed. The steel tower 20 has a structure in which equal angle steel bars or steel pipes are joined by bolts or the like. The steel tower 20 comprises main column members 21-24, a plurality of horizontal members 25, and a plurality of diagonal members 26. In FIG. 1, the horizon members 25 and the diagonal members 26 are shown in imaginary lines for the sake of better viewability. Base ends 21b-24b of the respective main column members 21-24 are fixed to the foundations 11-14. The main column members 21-24 extend upward (in +z direction) from the foundations 11-14. Each of distances between the main column members 21-24 decreases as the main column members 21-24 are at higher spots in the steel tower 20. Therefore, the steel tower 20 has a shape of a substantially truncated quadrangular pyramid and a central axis CA.

The horizontal members 25 and the diagonal members 26 reinforce the main column members 21-24 by those members 25 and 26 connecting the main column members 21-24 to each other. In other words, the horizontal members 25 and the diagonal members 26 are not directly connected to the foundations 11-14. The horizontal members 25 extend in a plane perpendicular to the central axis CA. Each of the diagonal members 26 extends at an angle relative to the plane perpendicular to the central axis CA. A truss structure is formed by the horizontal members 25 and the diagonal members 26.

The wind power generator 30 is located inside the steel tower 20. The wind power generator 30 includes a vertical axis wind turbine. A structure of the vertical axis wind turbine may be of various types, and may be, for example, gyromill type, Darius type, Savonius type, etc. The wind power generator 30 has a generator 31, a rotating main shaft 32, a first wind turbine 33, and a bearing 36. The rotating main shaft 32 extends upward from the generator 31. The first wind turbine 33 has a plurality of rotor blades 33w, a plurality of lower arms 33b, and a plurality of upper arms 33u. The plurality of rotor blades 33w is arranged in a cylindrical shape around the rotating main shaft 32. The plurality of lower arms 33b connects lower portions of the plurality of rotor blades 33w and the rotating main shaft 32. The plurality of upper arms 33u connects upper portions of the plurality of rotor blades 33w and the rotating main shaft 32. The bearing 36 rotatably supports an upper portion of the rotating main shaft 32.

The lower part structure 40 and the upper part structure 50 are support structures for supporting the wind power generator 30. The lower part structure 40 is located below the wind power generator 30. The upper part structure 50 is located above the wind power generator 30.

The lower part structure 40 has leg members 41-44. Upper ends 41u-44u of the respective leg members 41-44 are fixed to the generator 31. Base ends 41b-44b of the leg members 41-44 are fixed to the foundations 11-14, respectively. Due to this, each of the leg members 41-44 is fixed to corresponding one of the foundations 11-14 without intervention of the main column members 21-24. In other words, the generator 31 and each of the foundations 11-14 are directly connected by the corresponding one of the leg members 41-44. The leg members 41-44 extend at an angle relative to the plane perpendicular to the central axis CA. That is, the leg members 41-44 are diagonal members.

The base end 21b of the main column member 21 and the base end 41b of the leg member 41 are both fixed to the foundation 11. Similarly, the base end 22b of the main column member 22 and the base end 42b of the leg member 42 are both fixed to the foundation 12. Since the foundations 13 and 14 have the same structure, the descriptions thereof are omitted.

The upper part structure 50 has diagonal members 51-54. Each of the diagonal members 51-54 extends from the wind power generator 30 toward a corresponding one of the main column members 21-24, as the diagonal member 51-54 is displaced upward. In other words, the diagonal members 51-54 are angled with respect to the plane perpendicular to the central axis CA. A lower end 51b of the diagonal member 51 is fixed to the bearing 36 and an upper end 51u of the diagonal member 51 is fixed to the main column member 21. Similarly, a lower end 52b of the diagonal member 52 is fixed to the bearing 36, and an upper end 52u of the diagonal member 52 is fixed to the main column member 22. Since the diagonal members 53 and 54 have the same structure, their illustrations and descriptions are omitted.

(Effect)

In the configuration according to the present embodiment, each of the leg members 41-44 is fixed directly to the corresponding one of the foundations 11-14 without intervention of the main column members 21-24. Therefore, the self-weight of the wind power generator 30 and the wind load to be received by the wind power generator 30 can be directly received by the foundations 11-1-4 without being applied to the main column members 21-24. This makes it possible to prevent damage to the main column members 21-24 due to overloading.

If a new foundation is to be built for a wind power generator near a steel tower, it can be time-consuming and costly. This is because there is a need for construction of the foundation (e.g., concrete pouring) at the installation site. In addition, the steel tower may become an obstacle, due to which the time required to construct the foundation may be increased. In this configuration of the present embodiment, the foundations 11-14 of the steel tower 20 can be utilized as foundations for the wind power generator 30. This means that the installation cost of the wind power generator 30 can be reduced because there is no need to newly build a foundation for the wind power generator 30.

As shown in FIG. 1, a case where the wind power generator 30 is subjected to wind pressure in a direction of arrow F1 will be assumed. In this case, the wind load in the direction of arrow F1 is applied to the main column members 21-24. Then, the steel tower 20 is subjected to a bending moment with the foundations 11-14 as fixed ends. Therefore, a tensile load TL is applied to a part of the main column members 21 and 24 that is on an upwind side relative to the central axis CA. A compressive load CL is applied to a part of the main column members 22 and 23 that is on a leeward side relative to the central axis CA. If the compressive load CL exceeds a load bearing capacity of the main column members 22 and 23, the main column members 22 and 23 may buckle. To attend to such phenomenon, in the configuration of the present embodiment, the upper part structure 50 has the diagonal members 51-54. Due to this, a part of the compressive load CL to be applied to the main column members 22 and 23 can be received as an axial load AL1 on the diagonal members 52 and 53. A steel bar/steel pipe that constitutes the diagonal member 52 generally has a higher load bearing capacity of axial load than that of a bending load. Therefore, buckling of the diagonal members 52 and 53 can be suppressed. Given the above, resistance of the main column members 22 and 23 against the compressive load CL can be increased because a part of the compressive load CL can be distributed to the diagonal members 52 and 53.

In the configuration of the present embodiment, the leg members 41-44 of the lower part structure 40 are constituted by diagonal members. This allows a part of the compressive load CL to be applied to the main column members 22 and 23 to be received as an axial load AL2 on the leg members 42 and 43. This suppresses buckling of the leg members 42 and 43 while also a part of the compressive load CL can be distributed to the leg members 42 and 43. The resistance of the main column members 22 and 23 against the compressive load CL can be increased.

Second Embodiment (Configuration of Wind Power Generation System 201)

Figure 3:
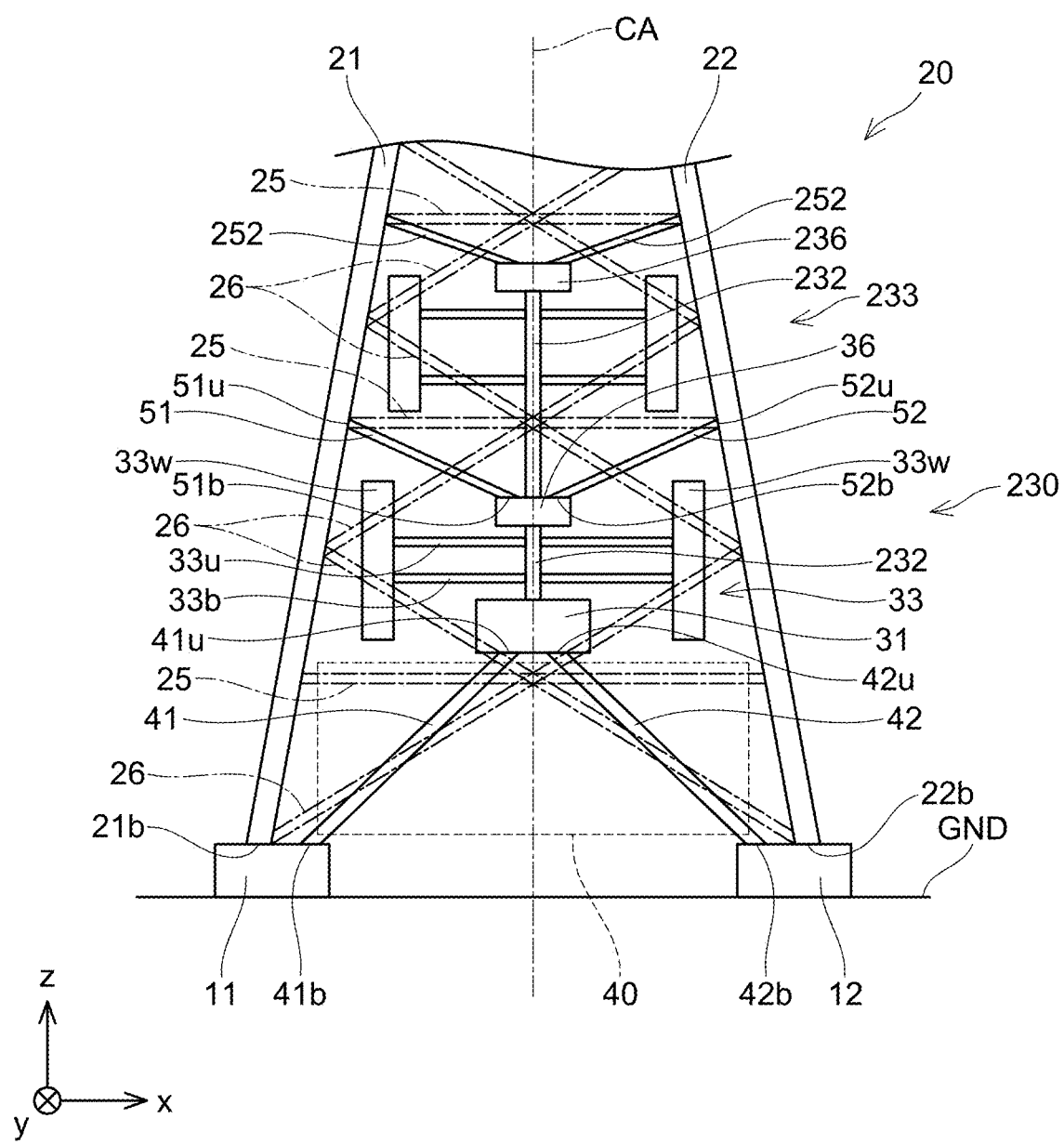
FIG. 3 shows a schematic cross-sectional view of a wind power generation system 201.

FIG. 3 shows a schematic cross-sectional view of a wind power generation system 201 according to a second embodiment. FIG. 3 is a side view at a same location as FIG. 1 of the first embodiment. Configurations common between the first and second embodiments will be denoted by the same reference numerals, and descriptions thereof will be omitted. Configurations unique to the second embodiment are distinguished by indicating them with a reference numeral of 200 to 299.

The second embodiment differs from the first embodiment in that it has a wind power generator 230. The wind power generator 230 of the second embodiment additionally comprises a second wind turbine 233, a bearing 236, and diagonal members 251-254 as compared to the wind power generator 30 of the first embodiment. The second wind turbine 233 is located inside the steel tower 20, and also above the first wind turbine 33. A specific structure of the second wind turbine 233 is the same as that of the first wind turbine 33, and thus description thereof will be omitted. The first wind turbine 33 and the second wind turbine 233 share a common rotating main shaft 232. An upper end of the rotating main shaft 232 is supported by the bearing 236. Each of the diagonal members 251-254 extends from the bearing 236 toward a corresponding one of the main column members 21-24, as the diagonal member 251-254 is displaced upward.

(Effect)

The wind power generator 230 of the second embodiment has a larger number of wind turbines and a higher height of the wind turbine from the ground GND than the wind power generator 30 of the first embodiment. Therefore, the wind power generator 230 of the second embodiment has a greater self-weight and wind load than the wind power generator 30 of the first embodiment. In the configuration of the present embodiment, the leg members 41-44 of the lower part structure 40 are constituted by diagonal members. The present embodiment also comprises the diagonal members 51-54 and the diagonal members 251-254. Therefore, a part of compressive load applied to the main column members 21-24 can be received as axial load by the leg members 41-44, the diagonal members 51-54, and the diagonal members 251-254. This makes it possible to increase the resistance of the main column members 22-24 against the compressive load.

Third Embodiment (Configuration of Wind Power Generation System 301)

Figure 4:
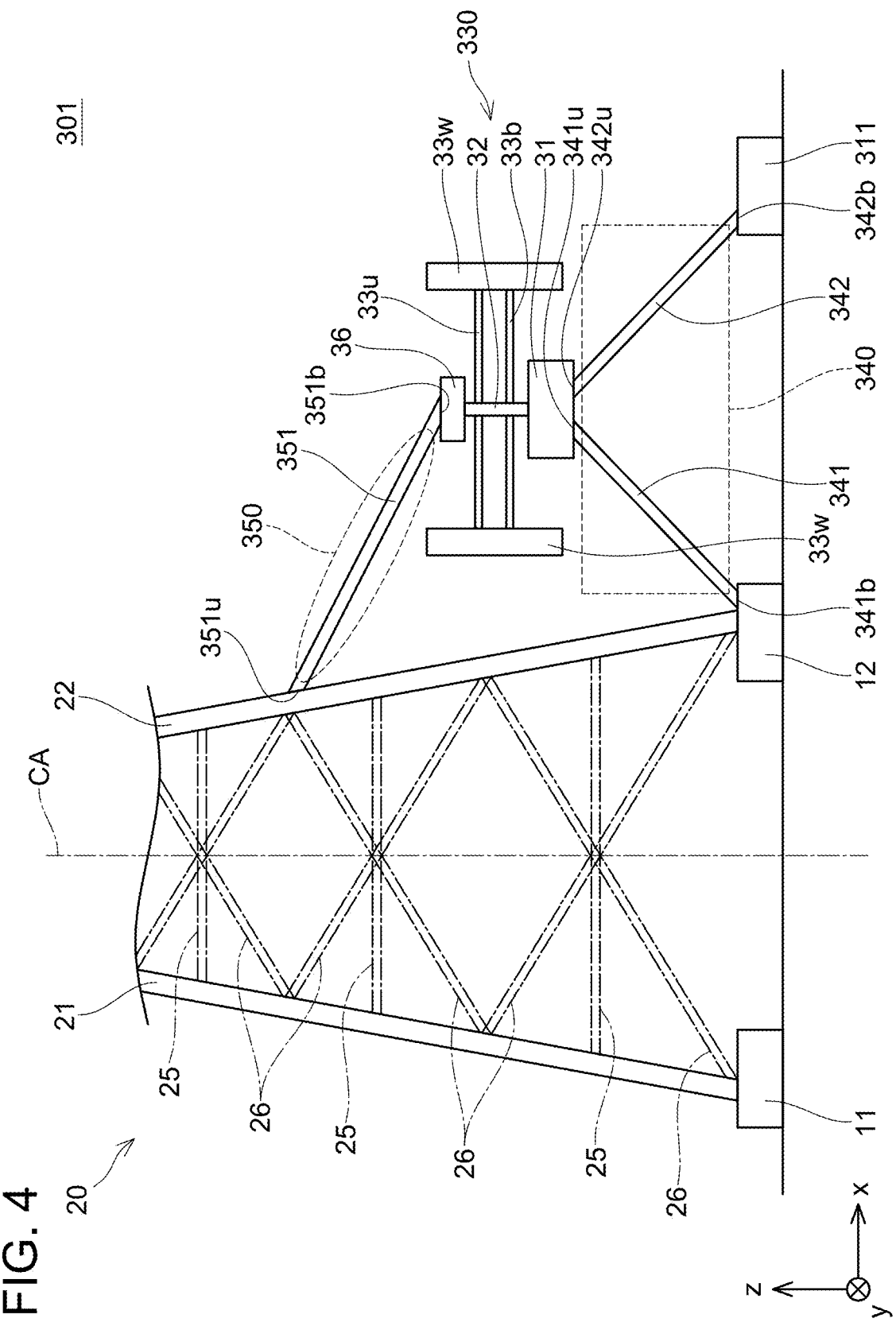
FIG. 4 shows a schematic cross-sectional view of a wind power generation system 301.

FIG. 4 shows a schematic cross-sectional view of a wind power generation system 301 according to a third embodiment. The third embodiment differs from the first embodiment in that a wind power generator 330 is located outside a steel tower 20. FIG. 4 is a side view at the same location as FIG. 1 of the first embodiment. Configurations common between the third embodiment and the first embodiment will be denoted by the same reference numerals, and descriptions thereof will be omitted. Configurations unique to the third embodiment are distinguished by indicating them with a reference numeral of 300 to 399. In FIG. 4, a foundation 312, leg members 343 and 344, and a diagonal member 352 are not shown.

The wind power generation system 301 further comprises foundations 311 and 312. The foundations 311 and 312 have no main column member fixed thereto. The foundation 311 is located on an +x side of a straight line connecting the foundation 11 and foundation 12. The foundation 312 is located on the +x side of a straight line connecting the foundation 14 and foundation 13. That is, a same quadrangle as one composed of the foundations 11-14 (see FIG. 2) is composed of the foundations 12, 311, 312, and 13.

The wind power generator 330 is located outside the steel tower 20. A lower part structure 340 has leg members 341-344. The leg members 341-344 are diagonal members extending at angles with respect to the plane perpendicular to the central axis CA. Upper ends 341$u$-344$u$ of the respective leg members 341-344 are fixed to a generator 31. A base end 341$b$ of the leg member 341 is fixed to the foundation 12. Although not shown in the figure, a base end 344$b$ of the leg member 344 is fixed to the foundation 13. Due to this, the leg members 341 and 344 are fixed to the foundations 12 and 13 without intervention of main column members 22 and 23. On the other hand, a base end 342$b$ of the leg member 342 is fixed to the foundation 311. Although not shown in the figure, a base end 343$b$ of the leg member 343 is fixed to the foundation 312.

An upper part structure 350 has diagonal members 351 and 352. Each of the diagonal members 351 and 352 extends from the wind power generator 330 to a corresponding one of the main column members 22 and 23 as the diagonal member 351, 352 is displaced upward. A lower end 351$b$ of the diagonal member 351 is fixed to a bearing 36 and an upper end 351$u$ of the diagonal member 351 is fixed to the main column member 22. Although not shown in the figure, a lower end of the diagonal member 352 is fixed to the bearing 36 and an upper end of the diagonal member 352 is fixed to the main column member 23.

(Effect)

Some of the four foundations 11-14 of the steel tower 20 (foundations 12 and 13) can be utilized as foundations for the wind power generator 330. Installation costs of the wind power generator 330 can be reduced. The diagonal members 351 and 352 can also be used to receive a part of compressive load to be applied to the main column members 22 and 23.

Modification for Third Embodiment

The number of wind turbine(s) comprised by the wind power generator 330 is not limited to one. As shown in the second embodiment, the wind power generator 330 may comprise plural wind turbines.

Fourth Embodiment (Configuration of Wind Power Generation System 401)

Figure 5:
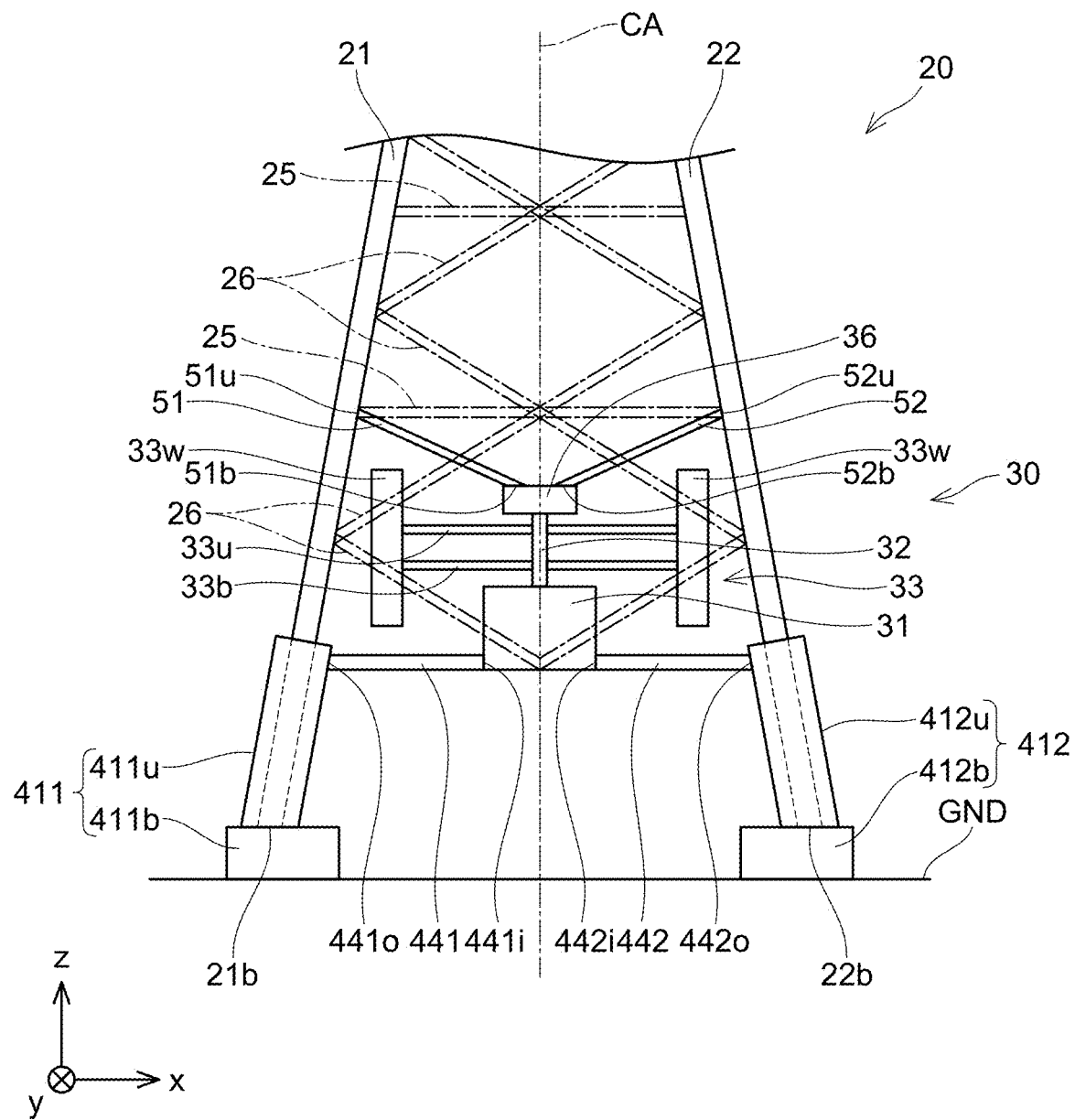
FIG. 5 shows a schematic cross-sectional view of a wind power generation system 401.

FIG. 5 shows a schematic cross-sectional view of a wind power generation system 401 according to a fourth embodiment. The fourth embodiment differs from the first embodiment in a structure of foundations. FIG. 5 is a side view at the same location as FIG. 1 of the first embodiment. Configurations common between the fourth embodiment and the first embodiment will be denoted by the same reference numerals, and descriptions thereof will be omitted. Configurations unique to the fourth embodiment are distinguished by indicating them with a reference numeral of 400 to 499. In FIG. 5, foundations 413 and 414 and leg members 443 and 444 are not shown.

Foundations 411-414 have foundation lower parts 411b-414b and foundation upper parts 411u-414u. The foundation lower parts 411b-414b are fixed to the ground GND. Each of base ends 21b-24b of main column members 21-24 is fixed to a corresponding one of the foundation lower parts 411b-414b. Each of the foundation upper parts 411u-414u surrounds a root part of a corresponding one of the main column members 21-24. Each of the foundation upper parts 411u-414u is a member that reinforces the root part of the corresponding one of the main pillar members 21-24. Lower ends of the foundation upper parts 411u-414u connect to the foundation lower parts 411b-414b. The foundation upper parts 411u-414u function integrally as a foundation supporting the steel tower 20 together with the foundation lower parts 411b-414b. A material and structure of the foundation upper parts 411u-414u may vary, and for example, it may have a tubular structure made of steel (iron).

Inner ends 441i-444i of the respective leg members 441-444 are secured to a generator 31. Outer ends 4410-4440 of the respective leg members 441-444 are fixed to the foundation upper parts 411u-414u, respectively. Due to this, each of the leg members 441-444 is thus fixed to a corresponding one of the foundations 411-414 without intervention of the main column members 21-24.

(Effect)

In the present embodiment, the foundation upper parts 411u-414u can serve to reinforce the root parts of the main column members 21-24. Then, the self-weight and wind load of the wind power generator 30 can be directly received by the foundation upper parts 411u-414u without being applied to the main column members 21-24.

Fifth Embodiment (Configuration of Wind Power Generation System 501)

Figure 6:
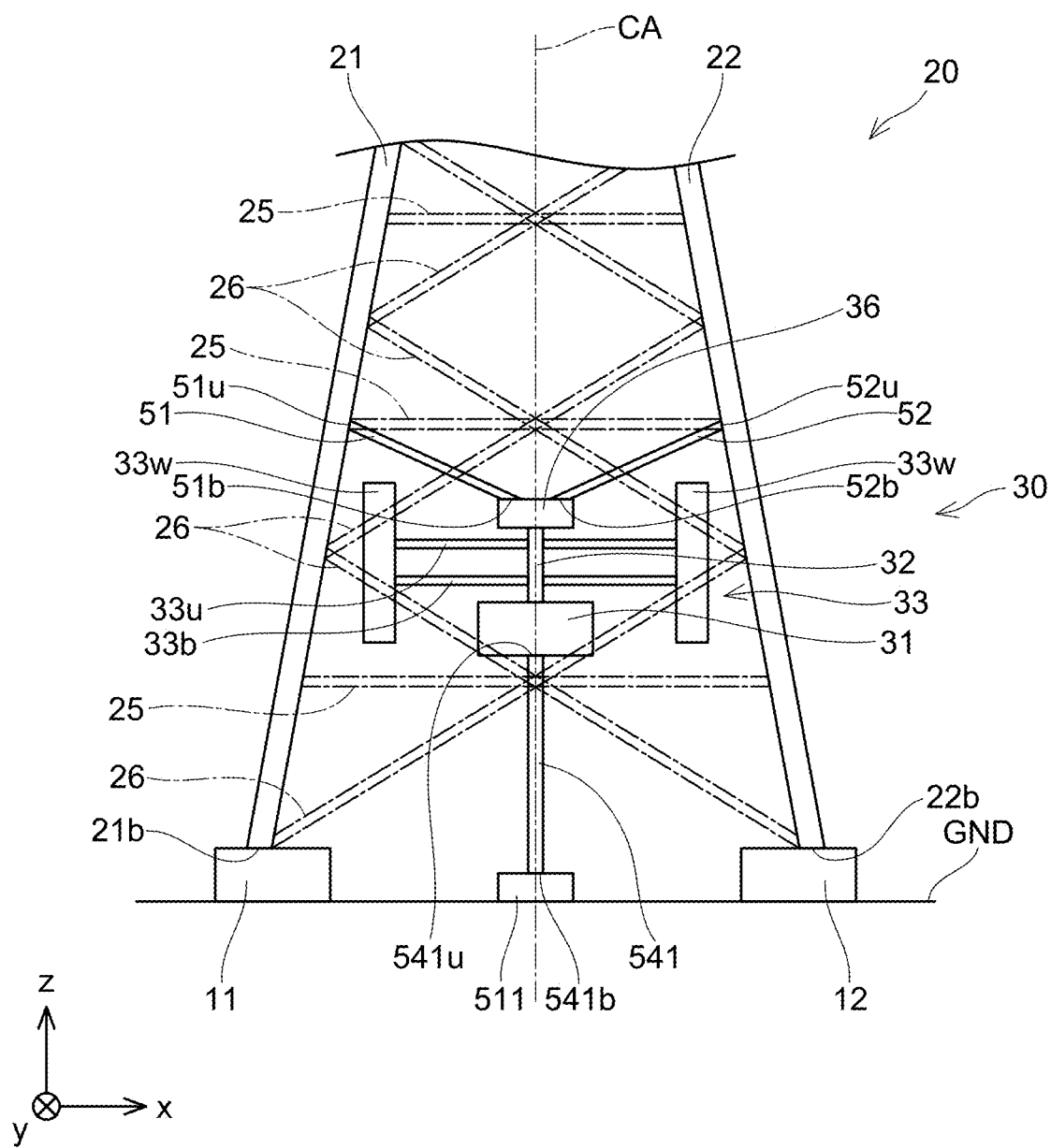
FIG. 6 shows a schematic cross-sectional view of a wind power generation system 501.

FIG. 6 shows a schematic cross-sectional view of a wind power generation system 501 according to a fifth embodiment. FIG. 6 is a side view at the same location as FIG. 1 of the first embodiment. Configurations common between the first embodiment and the fifth embodiment will be denoted by the same reference numerals and descriptions thereof will be omitted. Configurations unique to the fifth embodiment are distinguished by indicating them with a reference numeral of 500 to 599.

The wind power generation system 501 further comprises a foundation 511. The foundation 511 has no main column member fixed thereto. The foundation 511 is disposed vertically below a generator 31. A material and structure of the foundation 511 may be of various types. For example, the foundation 511 may be a pre-fabricated foundation. Due to this, they simply need to create a concrete product at a plant and then transport the same to the site and install the same. This eliminates need for on-site concrete placement, thereby restricting installation costs and shortening a construction period.

A leg member 541 extends along the central axis CA. An upper end 541u of the leg member 541 is fixed to the generator 31. A base end 541b of the leg member 541 is fixed to the foundation 511 without intervention of any of main column members 21-24. Due to this, the self-weight of the wind power generator 30 and wind load to be received by the wind power generator 30 can be directly received by the foundation 511 without being applied to the main column members 21-24. This makes it possible to suppress damage to the main column members 21-24 due to overloading.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

MODIFICATIONS

The upper part structure 50 (e.g., diagonal members 51-54) for fixing the upper part of the wind power generator 30 may be omitted.

Structures of the first wind turbine 33 and the second wind turbine 233 may be of various types, for example, they may be horizontal-axis wind turbines.

A structure of the steel tower 20 may be of various types. For example, the structure of the steel tower 20 may be a substantially triangular pyramid with three foundations.

What is claimed is:

1. A wind power generation system comprising: a plurality of foundations; a steel tower; a wind power generator; and a support structure supporting the wind power generator, wherein
the steel tower comprises a plurality of main column members extending upward from base ends fixed to the foundations, at least a portion of the support structure is fixed to at least one of the plurality of foundations without intervention of the plurality of main column members, the support structure comprises a lower part structure located below the wind power generator, the lower part structure is fixed to at least one of the plurality of foundations without intervention of the plurality of main column members, the support structure comprises an upper part structure located above the wind power generator, the upper part structure is connected to at least one of the plurality of main column members, and the upper part structure comprises a diagonal member extending from the wind power generator toward one of the plurality of main column members, as the diagonal member is displaced upward.

2. The wind power generation system according to claim 1, wherein the wind power generator is located inside the steel tower, the lower part structure comprises a plurality of leg members, and each of the plurality of foundations is fixed to both a base end of a corresponding one of the plurality of main column members and a base end of a corresponding one of the plurality of leg members.

* * * * *